US006397054B1

(12) United States Patent
Hoirup et al.

(10) Patent No.: US 6,397,054 B1
(45) Date of Patent: May 28, 2002

(54) FEATURES FOR EMERGENCY CALLING AND SHORT MESSAGING SYSTEM

(75) Inventors: Carsten Hoirup; Mara Frank, both of Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/124,908

(22) Filed: Jul. 30, 1998

(51) Int. Cl.[7] .............................. H04Q 7/20; H04Q 7/34
(52) U.S. Cl. ..................... 455/404; 455/404; 455/521; 455/450; 455/509; 455/466
(58) Field of Search ................... 455/404, 403, 455/521, 500, 466, 517, 414, 422, 450, 451, 452, 509, 456, 457, 550, 564

(56) References Cited

U.S. PATENT DOCUMENTS

| 5,594,739 A | * | 1/1997 | Lemieux | 455/466 |
| 5,809,424 A | * | 9/1998 | Eizenhoefer | 455/404 |
| 5,937,355 A | * | 8/1999 | Joong et al. | 455/466 |
| 6,014,556 A | * | 1/2000 | Bhatia et al. | 455/404 |
| 6,115,596 A | * | 9/2000 | Raith et al. | 455/404 |

FOREIGN PATENT DOCUMENTS

WO  WO97/21314  6/1997

OTHER PUBLICATIONS

"European digital cellular telecommunications system (Phase 2); Man–Machine Interface (MMI) of the Mobile Station (MS)", European Telecommunications Standards Institute, Oct. 1993.

Digital cellular telecommunications system (Phase 2 +); Mobile radio interface layer 3 specification, Aug. 1995.

"Asia Cellular Satellite System SAIS: Mobile Radio Interface Layer 3 Specification", Mar. 1997.

* cited by examiner

Primary Examiner—William Trost
Assistant Examiner—Keith Ferguson
(74) Attorney, Agent, or Firm—Coats & Bennett, P.L.L.C

(57) ABSTRACT

A method is provided for communicating emergency messages using non-voice connections. An emergency short message service is added to digital wireless standards, such as GSM-based standards. This service allows users to place an emergency call with the specific purpose of sending an emergency data message using Short Message Service (SMS). Such data messages might include the caller's geographical position, electronic mail messages, or possibly, diagnostic information. As a result, the emergency data messaging will be given the same access conditions as voice emergency calls in a cellular or satellite communications system.

19 Claims, 2 Drawing Sheets

FEATURES FOR EMERGENCY CALLING AND SHORT MESSAGING SYSTEM

BACKGROUND

The present invention relates generally to radiocommunication systems and methods for signaling in radiocommunication systems and, more particularly, to systems and methods for communicating emergency messages over non-voice communication channels in radiocommunication systems.

GSM (Global System for Mobile Communications) describes a European standard for radiocommunication and the corresponding Public Land Mobile Network (PLMN) which is intended to provide uniformity so that users can access radiocommunication systems throughout Europe with minimal equipment compatibility problems. GSM includes many services for subscribers, including a message function service called the Short Message Service (SMS) which provides for the transmission of text messages having up to 160 alphanumeric characters to be sent to or from a subscriber at his or her mobile unit.

When an SMS message is delivered from a service center to a mobile unit, regardless of how it originates, such a message is conventionally referred to as a "mobile terminated short message" (MTSM). If an SMS message originates at a mobile unit, the signal to the service center requesting forwarding of the SMS message is conventionally referred to as a "mobile originated short message" (MOSM). It is the MOSM which is the focus of the present invention.

In a GSM-based cellular or satellite communication process, such as the Asia Cellular Satellite system (ACeS), a procedure referred to as "connection establishment" identifies the type of call (e.g., an emergency call) initiated by or terminated at a mobile station. One skilled in the art will appreciate that GSM-based systems include, but are not limited to, GSM-based systems operating in the 900 MHz, 1800 MHz or 1900 MHz range.

Connection establishment involves the initial handshaking and exchange of control information between a mobile station and a GSM-based network, which occurs before a connection is established. This procedure gives GSM-based networks the ability to determine the eligibility of a mobile phone user to place a particular call (e.g., whether to grant or deny to certain users connection of certain calls based upon the user's subscription type). In the case of emergency calls, the establishment procedure is used by networks to grant open access to all users, regardless of subscription restrictions or other conditions that would normally block access for other types of calls.

An example of a call restriction placed on a GSM mobile phone user is one that may apply when the user's subscription belongs to a different network than the network which supports radiocommunication service in the area in which the user's equipment is currently located. For example, the two networks may not have a roaming agreement there between. Such a user may normally be denied access. As a result, the user would be unable to place normal phone calls or use other GSM services, such as the short messaging service (SMS), which require such access. In this instance, only emergency voice calling (i.e., calls to emergency numbers) may be available to the user. Such conventional emergency call handling procedures are set forth in "European Digital Cellular Telecommunications System (Phase 2); Man-Machine Interface (MMI) of the Mobile Station (MS)," GSM 02.30, Version 4.10.0, October 1993; "Digital Cellular Telecommunications Systems (Phase 2); and Mobile Radio Interface Layer 3 Specification," GSM 04.08, Version 4.9.0, July 1994, all of which are hereby expressly incorporated by reference.

There may be emergency situations in which a user would like or need to send a character or data message instead of placing an emergency voice call. For example, if a person was having a heart attack and was unable to speak, the transmission of a data message could possibly be the only way in which the person could summon emergency assistance. Such an emergency message could include, for example, the user's geographical location. In current GSM-based systems, however, the user would have to place a normal (non-emergency) call in order to send such a data message. When a user is restricted from placing normal calls, emergency data messages could not be sent.

Because GSM-based standards define emergency calls for voice only, only voice messages can be transmitted via a mobile station to an emergency operator. FIG. 1 illustrates a conventional emergency calling procedure for a GSM-based system. When a call is initiated from a mobile station, it transmits a CHANNEL REQUEST message to the cellular or satellite network (step 110). The CHANNEL REQUEST message contains an information element called the "Establishment Cause." The Establishment Cause, as the name suggests, provides the network with the type of call being established. Typical values for the Establishment Cause include: Answer to paging, Call re-establishment, Emergency call, Originating data call, Originating speech call, Location updating, and procedures that complete on the Stand Alone Dedicated Control Channel (SDCCH). The SDCCH cause indicates Short Message Service is desired. For emergency calls, the Establishment Cause is set to Emergency Call.

In response to the CHANNEL REQUEST, the network sends an IMMEDIATE ASSIGNMENT message to the mobile station, directing it to a dedicated control channel on which call setup can proceed (step 120) as follows.

After accepting the IMMEDIATE ASSIGNMENT message, the mobile station requests a service from the network by sending a service request message (step 130). In FIG. 1, a CM SERVICE REQUEST message is sent. The CM SERVICE REQUEST message contains a CM Service Type information element, which indicates the type of service desired. The CM Service Type can assume one of the following values: MS Originating Call Establishment, Emergency Call Establishment, Short Message Service, and Supplementary Service Activation. For an emergency call, the CM Service Type is set to Emergency Call Establishment.

When the ESTABLISHMENT CAUSE indicates that the mobile station requests an emergency call (i.e., the CM Service Type is set to Emergency Call Establishment), only an emergency voice call is permitted. Emergency calls in conventional GSM-based systems are specified only for mobile stations that support telephony. Hence, there is no way for a user to request emergency assistance from an emergency operator other than through voice transmissions.

SUMMARY

The present invention overcomes the above-identified deficiencies in the art by providing a method for communicating emergency messages using non-voice connections. According to exemplary embodiments of the present invention, an emergency short message service is added to existing digital wireless specifications, such as GSM-based systems. This service allows users to place an emergency call with the specific purpose of sending an emergency data message using Short Message Service (SMS). Such data messages might include the caller's geographical position, electronic mail messages, or possibly, diagnostic information. The emergency data messaging service of the present invention will be given the same access conditions as voice emergency calls in a cellular or satellite system.

BRIEF DESCRIPTION OF THE DRAWINGS

The above objects and features of the present invention will be more apparent from the following description of the preferred embodiments with reference to the accompanying drawings, wherein.

DETAILED DESCRIPTION

The following description is written in terms of cellular or satellite communication systems, but it will be understood that Applicants' invention is not limited to those environments. Also, the following description is written in the context of GSM-based cellular or satellite communication systems, but it will be understood by those skilled in the art that the present invention may apply equally well to other digital communication applications, e.g., those which employ code division multiple access (CDMA).

Figure 2:
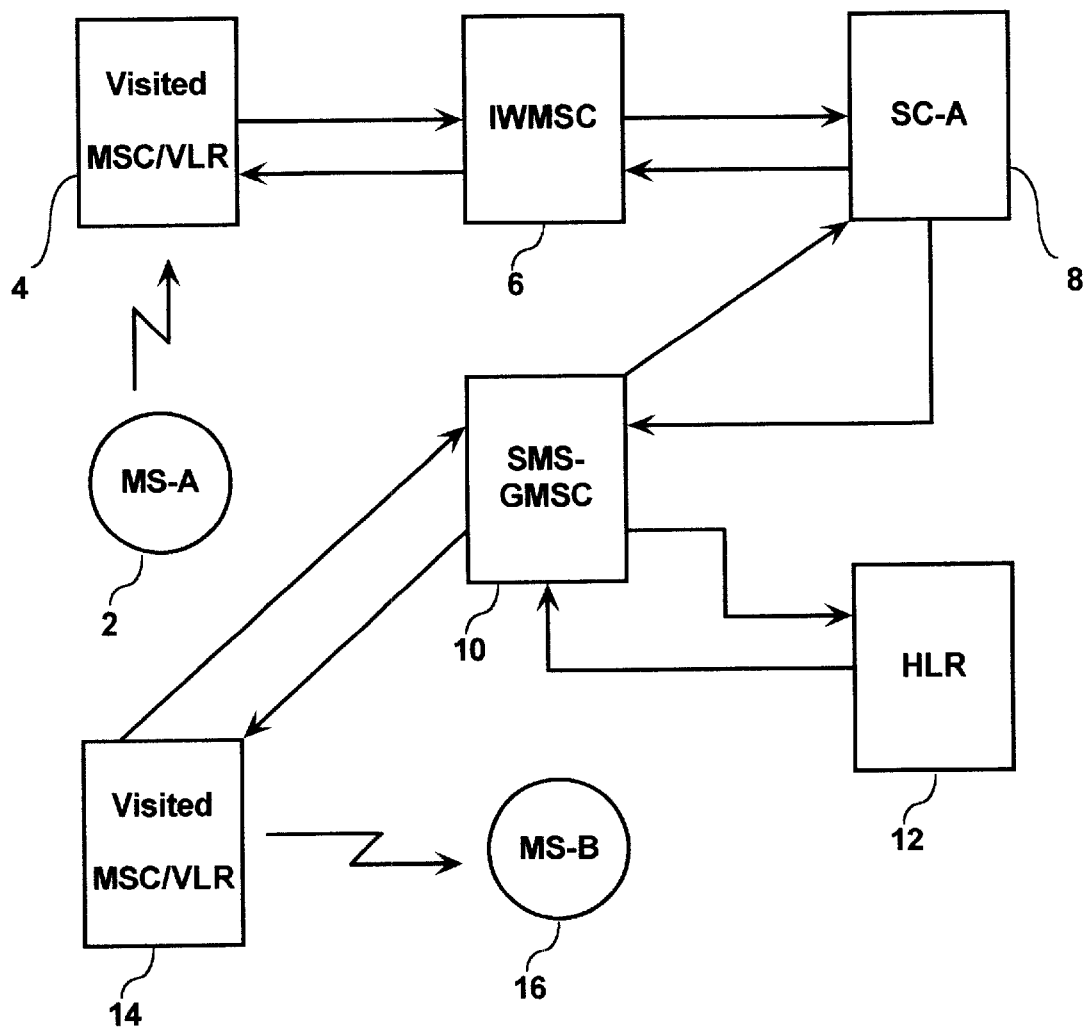
FIG. 2 illustrates an exemplary GSM network into which the principles of the present invention may be implemented.

FIG. 2 illustrates an exemplary GSM network in which the principles of the present invention may be implemented. In FIG. 2, an originating mobile station (MS-A) 2 sends an MOSM to the mobile switching center (MSC) 4 supporting the geographical area which the mobile station is currently visiting. Not shown explicitly in FIG. 2, but as will be apparent to those skilled in the art, is the base station which receives the signal from the mobile station 2 and forwards same to the MSC 4. The MSC 4 forwards the MOSM to interworking mobile switching center (IWMSC) 6 using an address of the service center assigned to mobile station 2 as part of the overhead information associated with the MOSM.

The IWMSC provides centralized interfacing functionality for SMS messaging. For MOSMs, the IWMSC 6 operates to transfer short messages to an identified service center (SC). The IWMSC also functions to transfer results associated with SMS message transmission back to the MSC. In this example, IWMSC 6 forwards the MOSM to SC-A 8. SC-A 8 acknowledges receipt of the MOSM back to IWMSC 6, which in turn forwards an acknowledgment back to MSC 4.

Service centers are "store and forward" devices which are logically outside of the mobile radio network. SCs operate to receive and store SMS messages, deliver SMS messages to mobile stations (or receivers outside of the mobile network) and, optionally, customize delivery of SMS messages according to service profiles stored at the SC. In the current example, SC-A 8 receives the MOSM from the IWMSC 6 and, assuming for the sake of this example that the subscriber associated with MS-A has a service profile stored at SC-A 8, performs one or more operations to the MOSM in accordance with the service profile. These operations may include, for example, copying the received SMS message and storing same, sending the SMS message according to a distribution list defined by subscriber A (e.g., routing the SMS message to an emergency messaging center), or converting the SMS message to a desired delivery media (e.g., a fax). After performing whatever operations are indicated by the service profile, SC-A 8 then sends the MOSM as an MTSM to the recipient (which can be a mobile station or any other type of receiving device) identified in the MOSM. This occurs as follows.

The MTSM is first sent to an SMS-gateway mobile switching center (GMSC) 10. Like its counterpart the IWMSC, the GMSC acts as a port into the mobile radio network. Before the GMSC 10 can deliver the SMS message through the chain of nodes to the base station (not shown) which is serving the recipient's mobile station, the GMSC 10 must first determine the location of the recipient's mobile station (i.e., which MSC is currently serving that mobile station). Thus, GMSC 10 first interrogates the recipient's home location register (HLR) 12 to obtain routing information for the message.

HLRs store data relating to subscribers including, for example, current location of the subscribers' equipment, directory number (MSISDN), radio number plan identification (e.g., International Mobile Subscriber Identity (IMSI)), supplementary service profiles and teleservice profiles. For MTSMs, HLRs provide (upon request) the identity of the visited MSC associated with a recipient of the SMS message, as well as information relating to whether the mobile station can receive the message (e.g., whether the subscriber is barred from receiving MTSMs). In the current example, to interrogate the HLR 12, a GSM MAP message called "Send Routing Information for Short Message" is sent by the GMSC 10 to the HLR 12. The appropriate HLR for interrogation can be determined using the recipient's MSISDN, e.g., by translating the MSISDN into a CCITT No. 7 address.

After receiving the routing information, e.g., the visited MSC number and IMSI, from HLR 12, the GMSC 10 forwards the message to the visited MSC/VLR 14 which is currently serving the recipient's mobile station MS-B 16. Note that for purposes of simplicity the visitor location register (VLR) has been illustrated in FIG. 2 as being integrated with the mobile switching center, although in practice these two nodes can be physically separated. The VLR manages data associated with subscribers which are currently situated within its area of responsibility, e.g., those which have roamed into the service area of that VLR. The VLR is updated with information from a subscriber's home location register. With respect to handling SMS messages, the VLR also stores an indication if a mobile station is unreachable for delivery of a particular MTSM. The VLR notifies the HLR when a mobile station can later be reached to deliver the MTSM.

The message is thus delivered to the MS-B 16 via a base station (not shown) over the air interface. Acknowledgment signals are then transmitted back through the chain of nodes.

As indicated above, conventional GSM-based networks fail to provide a method for communicating emergency messages using non-voice connections. Typically, one must speak with and give location information to an emergency operator in order to summon help when using a cellular or wireless phone. Emergency operators currently monitor voice calls only; monitoring of emergency calls of types other than speech is not generally available.

The present invention provides a method by which a caller can send special emergency messages to an emergency operator over a cellular or wireless phone. Such messages could include, for example, the caller's geographical position using data from a Global Positioning System (GPS) receiver incorporated into the mobile station, electronic mail, or diagnostic information from other systems (e.g., medical data) with which the mobile is communicating.

In order to provide an emergency data messaging procedure, the present invention adds two new parameters to the conventional GSM-based emergency calling procedure. As set forth above, the Establishment Cause typically indicates one of the following causes: Answer to paging, Call re-establishment, Emergency call, Originating data call, Originating speech call, Location updating, and procedures that complete on the Stand Alone Dedicated Control Channel (SDCCH). The present invention adds a new cause, an Emergency SDCCH Procedure cause, in order to indicate to the network that the mobile station wishes to establish an emergency procedure that completes on the SDCCH.

In addition, a new service type is added to the service request message (i.e., CM SERVICE REQUEST) in order to identify that the service requested by the mobile station is an emergency short message service. As a result, it is possible to establish emergency calls using the Short Message Service, even in those situations in which a mobile station is located in a geographic area in which communications for lower priority communicating would be prohibited, the user's subscription is limited, or the user has no subscriber identification module (SIM) card or a broken SIM card.

Figure 1:
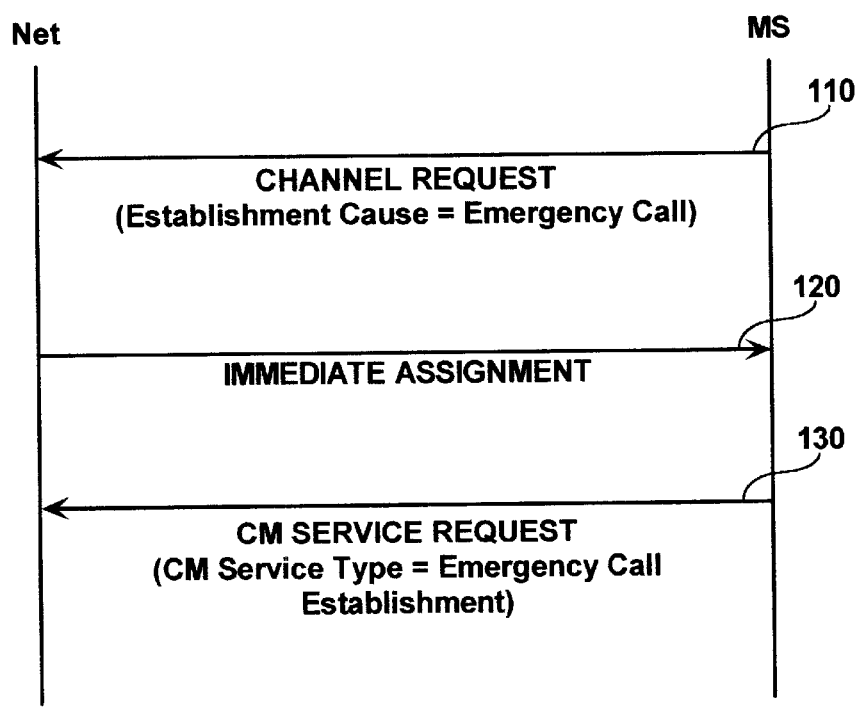
FIG. 1 illustrates a conventional GSM-based emergency calling procedure.
Figure 3:
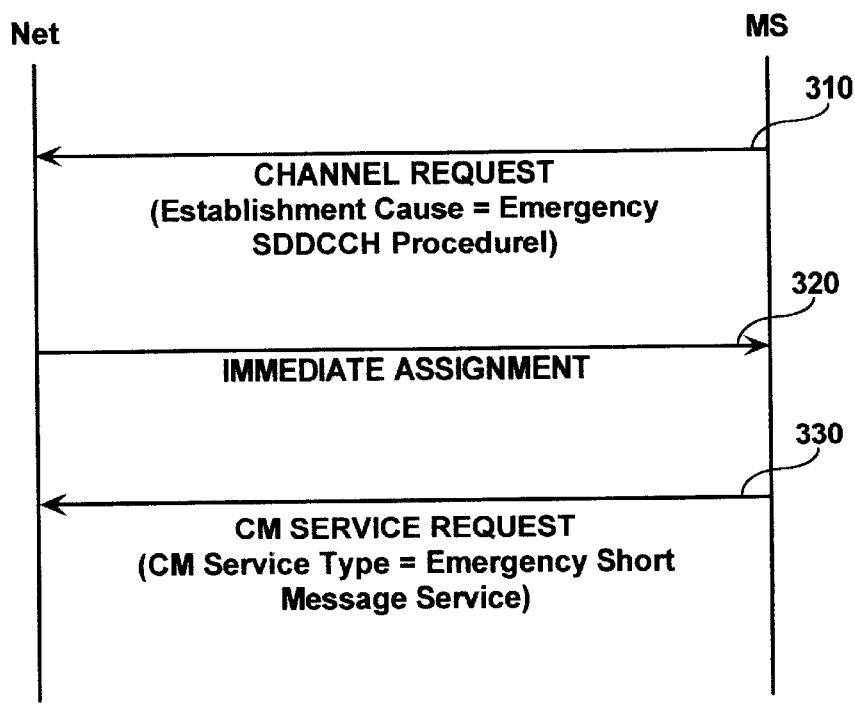
FIG. 3 illustrates a GSM-based emergency message routing procedure according to the present invention.

FIG. 3 illustrates an exemplary emergency data messaging procedure according to the present invention. When a call is initiated from the mobile station, a CHANNEL REQUEST message is sent from the mobile to the network (step 310). When the mobile is requesting the emergency SMS procedure of the present invention, the Establishment Cause, contained in the CHANNEL REQUEST message, indicates that an Emergency SDCCH Procedure is desired.

In response to the CHANNEL REQUEST, the network sends an IMMEDIATE ASSIGNMENT message to the mobile station (step 320). Similar to the conventional emergency calling procedure, the IMMEDIATE ASSIGNMENT message directs the mobile to a dedicated control channel on which call setup can proceed.

After accepting the IMMEDIATE ASSIGNMENT message, the mobile station transmits a CM SERVICE REQUEST message to the network (step 330). According to the present invention, the CM Service Type is specified as "Emergency Short Message Service." As a result, the emergency data message from the mobile station is given priority and routed to, for example, an emergency messaging center. The emergency messaging center could then provide the necessary assistance in a timely manner.

According to the present invention, a caller is given the ability to transmit a special emergency message to an emergency operator. The present invention specifies an extension to digital wireless systems (e.g., GSM-based systems) for incorporation of an emergency short message service. Municipalities could monitor messages transmitted using this service in order to provide the public with improved access to emergency assistance.

The present invention is of particular value to those who have special health problems, the elderly, children who are at home alone, or anyone who desires a high degree of personal security. One skilled in the art will appreciate that possible users of the present invention could include: a person who has epilepsy or asthma or heart failure or some condition that would prevent them from talking directly with an emergency operator; a child who is home alone after school who may need the ability to call for help easily in an emergency situation; a person who is being threatened by an attacker and who may not be able to speak directly with an emergency operator; or a person with an emergency who has a phone that is equipped with a GPS receiver and who is located in the wilderness.

Many variants and combinations of the techniques taught above may be devised by a person skilled in the art without departing from the spirit or scope of the invention as described by the following claims.

What is claimed is:

1. A method for routing emergency messages from an originating station in a radiocommunication network, said method comprising the steps of:
   sending a channel request from said mobile station indicating an emergency Stand-alone Dedicated Control Channel (SDCCH) procedure;
   receiving an assignment message at said mobile station in response to said channel request, said assignment message directing said mobile station to a dedicated logical channel; and
   sending, in response to the assignment message, a Communication Management (CM) service request indicating an emergency short message service (SMS);
   wherein said mobile station transmits at least one emergency message using SMS.

2. The method of claim 1 wherein said mobile station is a wireless phone.

3. The method of claim 1 wherein said at least one emergency message indicates a location of said mobile station.

4. The method of claim 1 wherein said at least one emergency message indicates medical diagnostic information.

5. The method of claim 1 wherein said dedicated control channel is used for call setup.

6. A system for routing emergency messages from an originating mobile station in a radiocommunication network, said system comprising:
   means for sending a channel request from said mobile station indicating an emergency Stand-alone Dedicated Control Channel (SDCCH) procedure;
   means for receiving an assignment message at said mobile station in response to said channel request, said assignment message directing said mobile station to a dedicated logical channel; and
   means for sending, in response to the assignment message, a Communication Management (CM) service request indicating an emergency short message service (SMS);
   wherein said mobile station transmits at least one emergency message using SMS.

7. The system of claim 6 wherein said mobile station is a wireless phone.

8. The system of claim 6 wherein said at least one emergency message indicates a location of said mobile station.

9. The system of claim 6 wherein said at least one emergency message indicates medical diagnostic information.

10. The system of claim 6 wherein said dedicated control channel is used for call setup.

11. A method for requesting emergency assistance by a user of an originating mobile station in a radiocommunication network, said method comprising the steps of:

requesting, by said mobile station, an emergency short message service (SMS); and sending, by said mobile station, at least one emergency data message to an emergency operator using SMS;

wherein said at least one emergency data message is given a same access condition to said radiocommunication network as a voice emergency call.

12. The method of claim 11 wherein said mobile station is a wireless phone.

13. The method of claim 11 wherein said at least one emergency data message indicates a geographical position of said mobile station.

14. The method of claim 11 wherein said at least one emergency data message indicates medical diagnostic information.

15. A method of claim 11, wherein said at least one emergency data message is sent over non-voice communication channels.

16. A method for requesting emergency assistance by a user of an originating mobile station in a radiocommunication network, said method comprising the steps of:

sending a channel request from said mobile station indicating an emergency Stand-alone Dedicated Control Channel (SDCCH) procedure;

requesting, by said mobile station, an emergency short message service (SMS); and sending, by said mobile station, at least one emergency data message to an emergency operator using SMS;

wherein said at least one emergency data message is given a same access condition to said radiocommunication network as a voice emergency call.

17. A method for routing emergency messages from an originating mobile station in a radiocommunication network, said method comprising the steps of:

sending a channel request from said mobile station indicating an emergency procedure;

receiving an assignment message at said mobile station in response to said channel request, said assignment message directing said mobile station to a dedicated logical channel; and sending, in response to the assignment message, a service request indicating an emergency message;

wherein said mobile station transmits at least one emergency message.

18. The method of claim 17, wherein said emergency procedure being an emergency Stand-alone Dedicated Control Channel (SDCCH) procedure.

19. A method of claim 17, wherein said at least one emergency message is sent over non-voice communication channels.

* * * * *